UNITED STATES PATENT OFFICE.

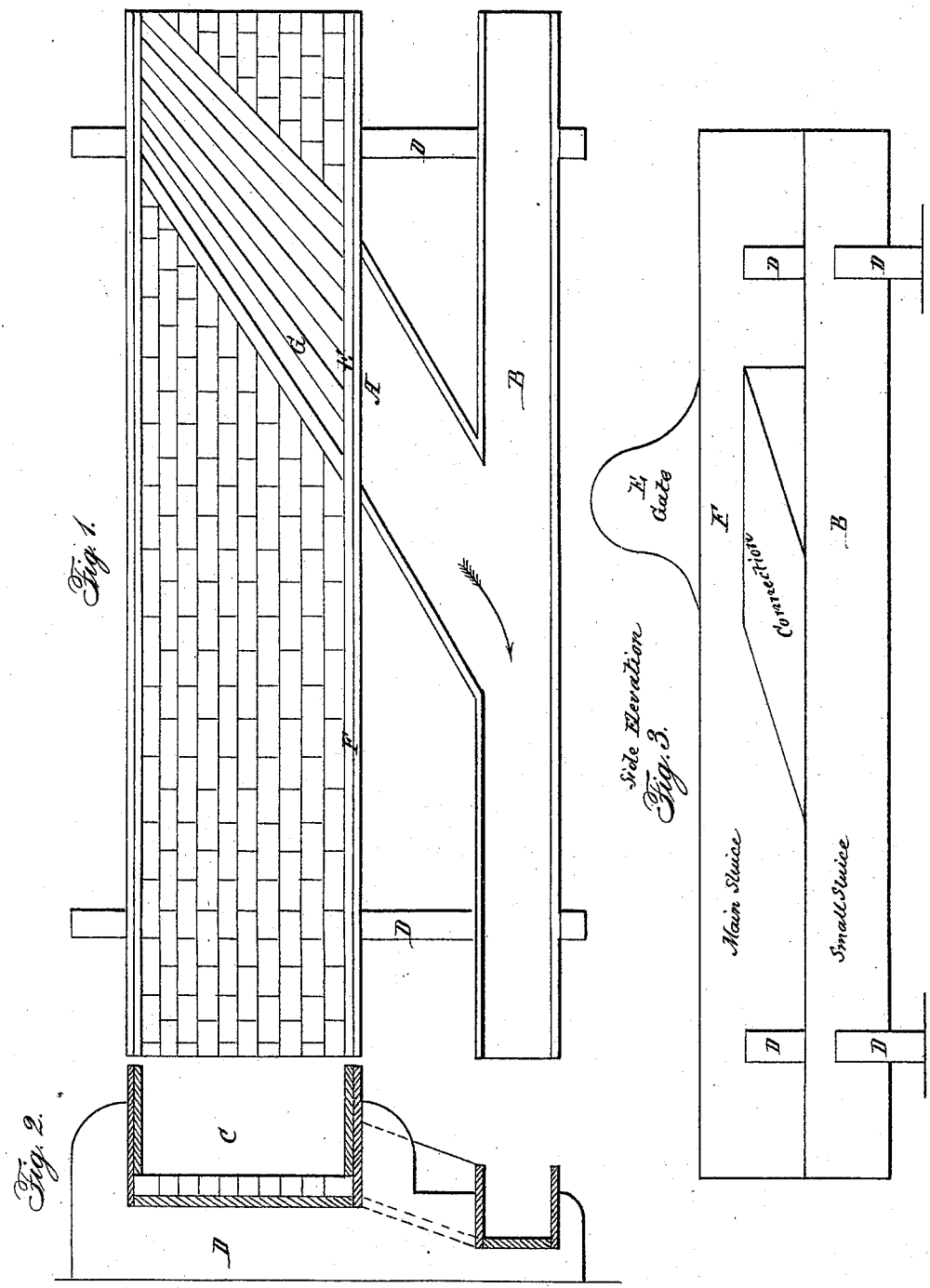

MORRIS BRADLEY, OF EMPIRE RANCH, CALIFORNIA.

IMPROVED GOLD-WASHER.

Specification forming part of Letters Patent No. 33,376, dated October 1, 1861.

*To all whom it may concern:*

Be it known that I, MORRIS BRADLEY, of Empire Ranch, county of Yuba, and State of California, have invented a new and Improved Method of Washing or Separating Gold from its Native Combinations; and I do hereby declare that the following is a full and exact description thereof, reference being had to the accompanying drawings, and to the letters of reference marked thereon.

The nature of my invention consists in providing a common sluice (such as heretofore used) with an auxiliary or second sluice placed alongside and parallel to the main sluice, as shown by the drawings which accompany this specification. This secondary sluice is placed somewhat lower than the main one for the purpose of obtaining a fall for the water. In the main sluice and near the bottom there are openings made in that side next to the small sluice—say once in fifty feet or any convenient distance apart—one of which openings is shown in the drawings with a gate to regulate the discharge of water. Opposite these openings in the main sluice is placed a peculiar kind of grating, which, together with the opening in the side and the gate to regulate the discharge, constitute my invention and improvement. Those grates are set into the sluice at any convenient angle so as to obtain a free discharge, the grates being set so that the space between them is the widest next the discharge-opening, and so that it is impossible for anything to clog or choke them up. This arrangement of the grates is clearly shown at A in the drawing No. 1, Figure 1, in plan.

To enable others skilled in the art to make and use my invention, I will proceed to describe its construction and operation.

In order that my invention may be clearly understood, I will first make reference to the drawings presented.

The drawing No. 1 represents the ordinary sluice now in use, with blocks of granite in the bottom. The grates marked G are intended to be made of cast-iron and placed in the sluice, as shown in the drawings, with the ends next the small flume placed wider apart than at the other end, so as to allow any and all things that fall in between them to be carried out by the force of the water into the small sluice lying parallel with the main sluice, the small one being marked B, the current and direction of the water being shown by the arrow. This small sluice is to be continued alongside of the large one, and at about fifty feet, or thereabout, the series of grates and the opening and discharge are to be repeated, with the gate marked E in elevation, No. 3, to regulate the discharge. The position of the two flumes with the support is shown at D and C in No. 2, the flumes in section and the support in elevation.

The drawing No. 3 shows the whole in elevation, the small sluice being next the viewer, the object being to keep the large sluice free from the fine particles of gold and dirt that have been abraded from the large masses or lumps of dirt or cement, and thereby give the large lumps a better chance to grind one upon the other and upon the bottom of the main sluice and a more ready access to the gold which by the operation is deposited in the small sluice.

The cover of the spout that conveys the water from the larger to the smaller sluice is removed in the drawing No. 1, so as to give a clear idea of the mode of the discharge and direction of the water. This cover has for its object to prevent any particles of gold or water from being spattered over the sides in its descent to the small sluice.

What I claim as my invention, and desire o secure by Letters Patent, is—

1. The placing the grate-bars or riffles wider apart at the end next the discharge, so that it is impossible for them to become clogged with dirt or other matter.

2. The opening and discharge in the side and near the bottom of the main sluice.

3. The arrangement of the gate in connection with the others.

4. The small sluice as connected with and laid parallel to the main sluice, the whole when combined constituting a new and useful invention.

MORRIS BRADLEY.

Witnesses:
S. C. TOMPKINS,
VINCENT BROWN.